United States Patent [19]

Bachmeir et al.

[11] Patent Number: 5,052,294
[45] Date of Patent: Oct. 1, 1991

[54] BENDING COMPENSATED PRINTING WEB DEFLECTION ROLLER

[75] Inventors: Xaver Bachmeir, Augsburg; Wolfgang Prem, Ustersbach, both of Fed. Rep. of Germany

[73] Assignee: Man Roland Druckmaschinen AG, Offenbach am Main, Fed. Rep. of Germany

[21] Appl. No.: 667,502

[22] Filed: Mar. 11, 1991

[30] Foreign Application Priority Data

Mar. 30, 1990 [DE] Fed. Rep. of Germany ....... 4010192

[51] Int. Cl.$^5$ .................... B41F 13/08; B41L 35/00
[52] U.S. Cl. ................................. 101/216; 29/116.2
[58] Field of Search ............... 101/216, 219, 212, 247, 101/152, 153, 348, 148, 228, 181; 29/116.1, 116.2; 100/162 B, 168, 169; 384/192, 201, 205, 256

[56] References Cited

U.S. PATENT DOCUMENTS

| 4,068,360 | 1/1978 | Freuler | 29/116.2 |
| 4,095,856 | 6/1978 | Markovitz | 384/206 |
| 4,637,109 | 1/1987 | Bryer | 29/116.2 |
| 4,793,250 | 12/1988 | Nistanen | 29/116.2 X |

FOREIGN PATENT DOCUMENTS 8137709 6/1982 Fed. Rep. of Germany.

Primary Examiner—J. Reed Fisher
Attorney, Agent, or Firm—Frishauf, Holtz, Goodman & Woodward

[57] ABSTRACT

To provide a pre-bending stress on a shaft (1) supporting a plurality of bearings (2, 3) which, in turn, support a roller sleeve (4), the shaft is fitted at the end portions thereof into a sleeve (5) formed with radial projections (6, 7). The sleeve is pivotably retained in a support holder (8, 9) having projecting jaws (8), fitting around the projections (6, 7) of the sleeve. Coupling pins or bolts (13) pivotably or tiltably interconnect the sleeve and the jaws. To provide a pre-stressing tilt against the ends of the shaft, engagement or adjustment screws (18, 19) can lock the projections (6, 7) extending from the coupling sleeve (5) in predetermined pivoted or tilted position with respect to the side walls (11) of the machine, to which the support holder (9) is secured. Preferably, a part-spherical interposed coupling is located between a head and counter nut of the adjustment bolts.

7 Claims, 3 Drawing Sheets

BENDING COMPENSATED PRINTING WEB DEFLECTION ROLLER

FIELD OF THE INVENTION

The present invention relates to printing machinery, and more particularly to a printing machine roller, and especially to an arrangement to prevent bend-through of the roller of the type in which a hollow cylindrical element is rotatably retained on a central shaft, and is generally used as a deflection roller for a web.

BACKGROUND

Many types of deflection rollers used in guiding of webs, whether used in printing machinery or other types of machinery, utilize rollers which are formed as hollow cylindrical elements, retained on fixed shafts. Rollers of this type are used, for example, in rotary printing presses. In dependence on the wrap angle of the web, the webs will apply tension on the roller, in the direction of a bisecting center line through the wrap angle of the web. This force results in a torque which causes bending of the deflection roller. This bending force is stronger in the center of the roller than at the ends. Due to this bend-through, the web is stretched more at the edges than in the center. Danger of tearing at the edges results and, as the web is passed around the roller, it has the tendency to form folds or creases. Good printing results, however, require a smooth run of printing substrate webs over deflection rollers, without creases or overlaps.

THE INVENTION

It is an object to provide a simple and inexpensive arrangement, especially suited for mass production, to prevent bend-through of a hollow roller and especially to prevent bend-through upon application of a wrap-around force or torque.

Briefly, a support holder projects from each of the side walls, the support holder forming part of a pivot joint by being connected, with coupling pins, to a sleeve within which the end of the shaft is retained. The sleeve is connected to the support holder by adjustment screws to constrain the sleeve to tilt or pivot about the axis of the coupling pin elements by a pivot angle which counteracts bend-through of the shaft due to forces exerted thereon upon passing a tensioned web about a cylinder rotatably retained on the shaft.

The arrangement has the advantage that, inexpensively and simply, the shaft can be subjected to a bending force by pivoting or tilting the sleeve, forcefully, due to the screw connection of the sleeve which will bear, directly or indirectly, against side walls retaining the roller.

DRAWINGS

DETAILED DESCRIPTION

Figure 1:
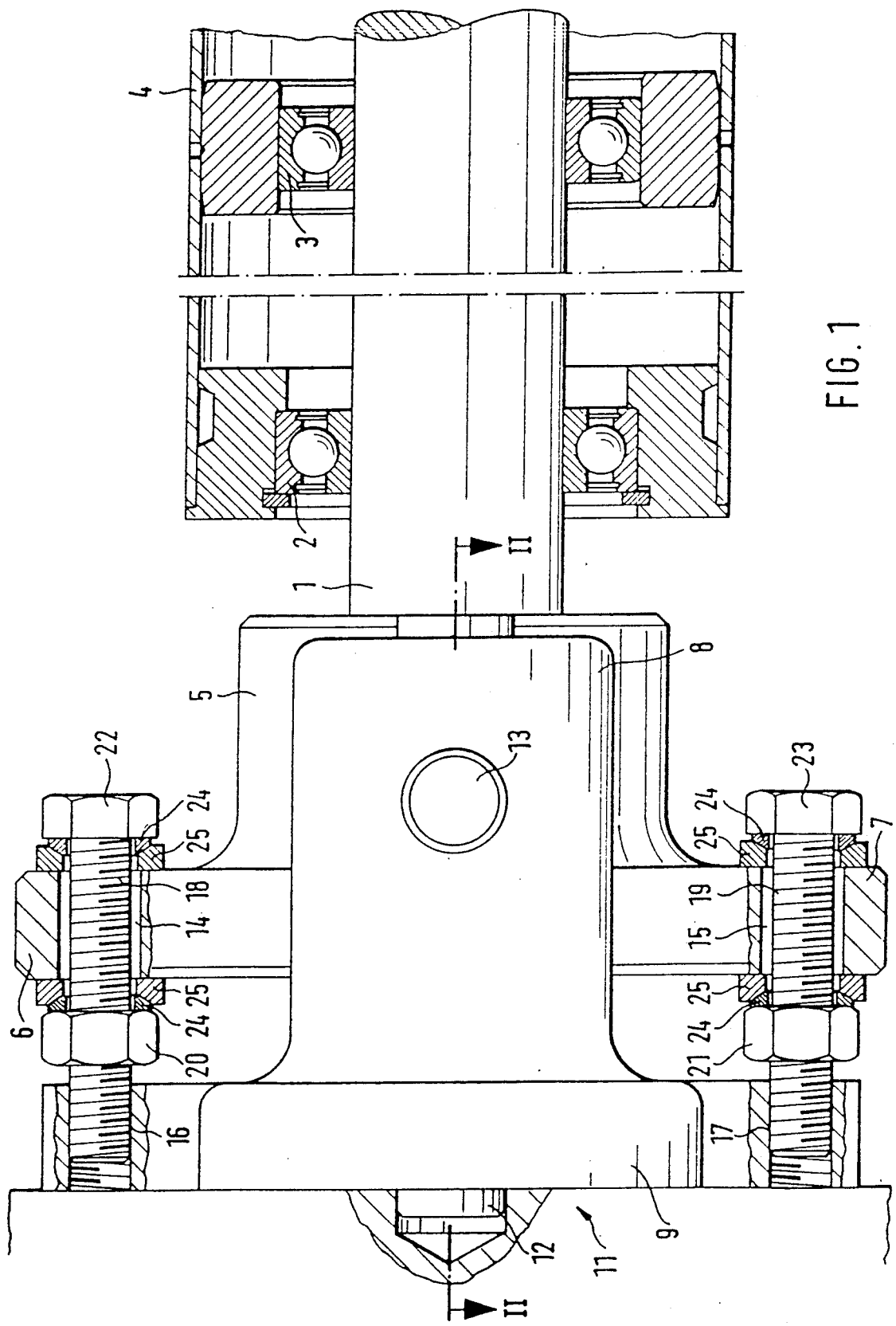
FIG. 1 is an axial part-sectional view through a shaft bending arrangement in accordance with the invention.

The invention will be explained in connection with a deflection roller for use in a rotary printing machine. A shaft 1 has a plurality of bearings, usually at least three bearings 2, 3 located thereon, the bearings, in turn, supporting a roller sleeve 4 rotatably about the shaft 1. Usually, one bearing, for example bearing 3, is located generally in the center of the shaft, and two more bearings are located adjacent the end portion thereof.

In accordance with a feature of the invention, the ends of the shaft 1 are pivotably supported from the side walls 11 of the printing machine, in such a manner that the tilt or pivot angle into which the shaft is forced at the ends, is fixed and adjustable.

Each one of the ends 3 is located in a joint which includes a sleeve 5 which receives the end portion of the shaft 1. The sleeve 5 is formed with two radially extending projections 6, 7, offset with respect to each other by 180°.

The sleeve 5 is located between the jaws 8 of a support holder 9. The jaws 8 are secured by screws 10 on the side wall 11 of the printing machine. The screws 10 are uniformly circumferentially located about the center of the shaft 1; for example, the screws 10 can be spaced from each other by an angle of 45°; different angular spacings can be used. The support holder 9 centrally touches the side wall 11 and, to ensure precise positioning, the support holder is formed with a wedge-shaped or conical centering projection 12, extending into a centering hole formed in the side wall 11. Each one of the jaws 8 has a pivot bolt or pin 13 secured therein which extends inwardly towards the sleeve 5 and pivotably or tiltably retains the sleeve 5 between the jaws 8. The bolts 13 are coaxially positioned, the common axis extending at right angles to the axis of the shaft 1.

Figure 2:
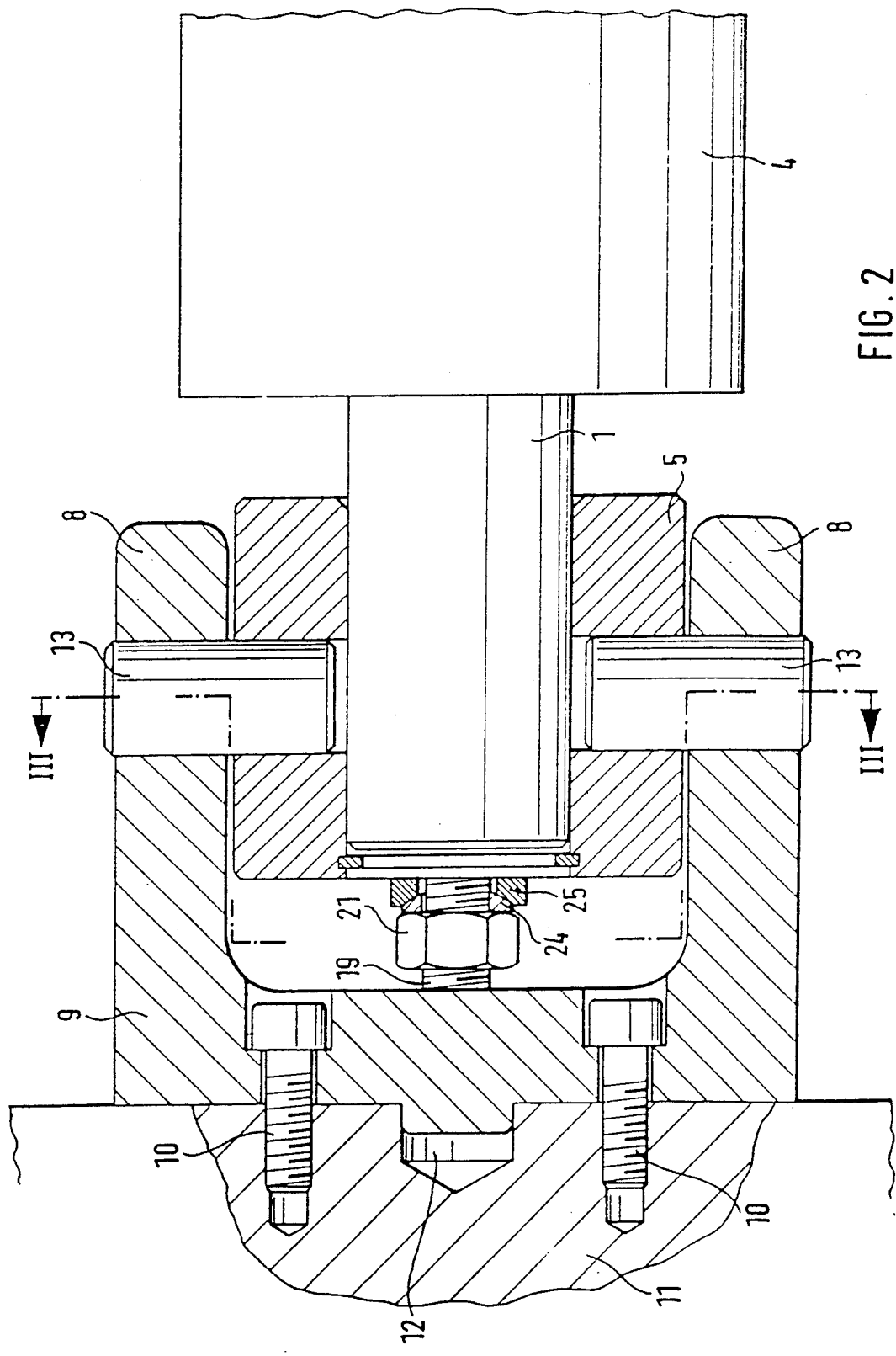
FIG. 2 is a section along line II—II of FIG. 1.
Figure 3:
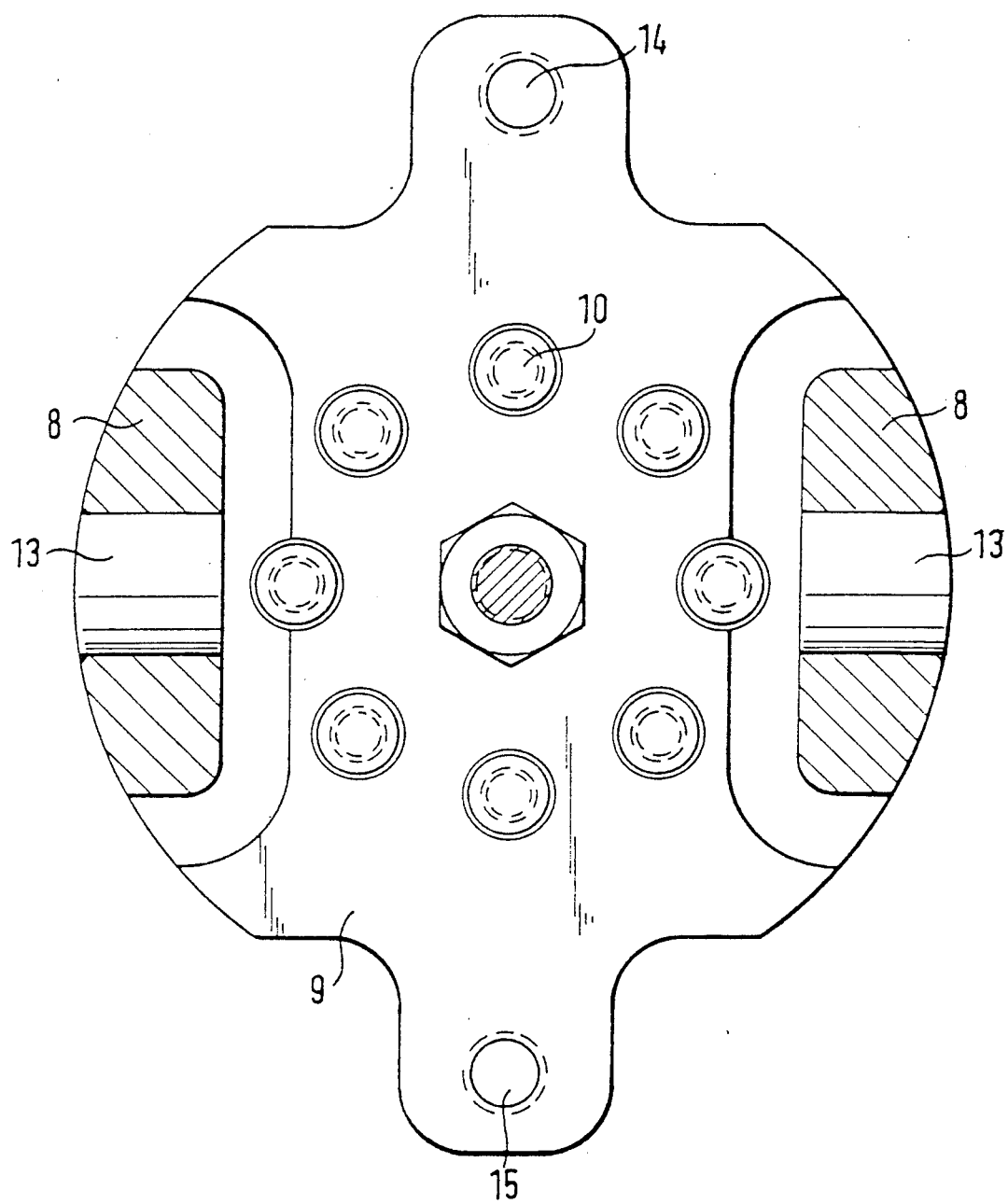
FIG. 3 is a section along line III—III of FIG. 2.

If the jaws 8 are comparatively long in axial direction, or the shaft 1 is foreshortened, one through-bolt 13 could be used rather than the two stubs, as shown in FIG. 2; alternatively, the bolts 13 can be fixed in position and the jaws 8, 9 can be made to tilt slightly, for example by using attachment bolts 10 which permit some play or forming the end portion of the support holder with the jaws 8, 9 with a curved, for example slightly spherical surface.

Bores 14, 15 are located in the projecting lateral portions 7, 8 of the sleeve 5; each one of the bores 14, 15, respectively, have an inner thread 16, 17, which is opposite to the holder 9. Adjustment screws 18, 19 are screwed into the threads 17, 18 of the holder element 9, freely passing through the bores 14 and 15; adjustment nuts 20, 21 are located on the bolts. The bolts are formed with screw heads 22, 23. To permit tilting, spherical engagement coupling washers 24, 25 are located between the nuts 20, 21 and the bolt heads 22, 23, respectively, at each side of the projecting end portions 6, 7 of the sleeve 5.

Bend-through adjustment

The sleeve 5 is assembled with the holder portion 8, as seen in FIG. 1. The adjustment screws 19 are screwed into the holder 9. By selectively screwing in screw 19, while loosening the opposite screw 18, sleeve 5 will rotate in clockwise direction about the bolts or pins 13, which connect the sleeve 5 and the jaws 8 of the holder support 9. This, with reference to FIG. 1, tends to bend the shaft 1 downwardly. Transverse stresses which occur in the material due to the shift of the sleeve 5 can be accepted by the part-spherical coupling washers and compensating elements 24, 25.

The end of the shaft 1, which is not shown, has a similar or identical joint. Thus, the bending curve of the shaft 1 can be arranged entirely independently by selectively loosening or tightening the bolts 18, 19 at the ends of the shaft 1. This is of particular importance if the width of the webs changes, for example if webs of half-widths are handled which extend only about half the width of the roller. The bend-through of the shaft 1 is transferred primarily via the bearings 2, 3, and mostly by the bearing 3 in the center region of the shaft 1 to the jacket or cover 4. Thus, the entire roller will bend in the desired direction or, conversely, the bending will counteract stresses which are especially applied in the center part of the roller. The desired amount of bending can readily be determined by merely visually observing the web as it passes over the roller. When the web does not make any folds or creases across its width, the bend is correct.

The system is suitable for deflection rollers regardless of the wrap angle of the web about the roller. If the wrap angle changes, a bisector of the wrap angle may also change in direction. If the direction changes, the radially located screws 10 which retain the holder element 9 on the side wall 11 can be loosened, and removed, and the entire structure shifted by angles of 45°, so that the bending torque which is supplied by the joint to the roller 1-4 coincides, as far as possible, with the bend-through direction to which the roller is subjected, so that compensation can be obtained. The centering pin 12 ensures the correct position of the holder structure in the side wall 11. Of course, larger or smaller numbers of screws 10 may be used, thus providing for either finer adjustment or lesser cost with, however, a lowered possibility of matching the actual bend-through direction to the compensation direction.

Various changes and modifications may be made within the scope of the inventive concept.

We claim:

1. System to prevent bend-through of a roller (1-4) retained between a pair of side walls (11),
   wherein the roller comprises
   a shaft (1) having opposed end portions;
   at least one bearing (2) located on the shaft; and
   a cylindrical roller cover or sleeve (4) surrounding the shaft and rotatably mounted thereon by said at least one bearing; and
   means for constraining said shaft in position to prevent bend-through of the roller,
   said bend-through prevention means comprising, in accordance with the invention,
   a pivot joint coupled to each of the side walls (11), respectively and to said shaft (1) end portions respectively, each pivot joint having a pivot axis extending at right angles to the axis of the shaft, and including
   a support means (9) projecting from the side walls (11);
   a sleeve (5) surrounding each of the end portions of the shaft;
   coupling pin means (13) coupling the sleeve to said support means (9) and pivotably or tiltably retaining the sleeve on the support means; and
   adjustment screw means (18, 19, 20, 22, 21, 23) for adjusting the pivot angle of the sleeve with respect to the support means to orient said sleeve therein and hence constrain the shaft (1) to follow said orientation.

2. The system of claim 1, wherein the support means (8, 9) comprises a pair of jaws (8, 9); said sleeve (5) is formed with radial projections (6, 7) extending between the jaws (8) of the support means;
   and wherein said adjustment screw means pass through said radial projections (6, 7) and are connected to the support means (9).

3. The system of claim 2, wherein said adjustment screw means pass freely through said radial projections (6, 7), are screwed into said support means, and have adjustable abutment means (20, 22; 21, 23) engaging against both sides of said radial projections.

4. The system of claim 3, wherein said abutment means comprises a counter nut (20, 21) and a head (22, 23) formed, respectively, on said adjustment screw means;
   and further including spherical coupling means (24, 25) located between the abutment means and the radial projections, respectively.

5. The system of claim 1, further including repositionable screw means (10) connecting each said support means (9) to the respective side wall (11), said respective screw means being located in a circle about the axis of the shaft (1) to permit change of the relative position of the each said support means (9) with respect to the side wall (11).

6. The system of claim 5, further including interengaging projection and recess centering means (12) formed, respectively, in each side wall and the support means (9).

7. The system of claim 1, wherein said support means comprises a plate-like element (9); and
   circumferentially adjustable means (10) are provided, securing said plate-like element to the respective side wall while permitting circumferential adjustment thereof, with respect to the axis of said shaft.

* * * * *